US010619330B2

(12) United States Patent
Becker et al.

(10) Patent No.: US 10,619,330 B2
(45) Date of Patent: Apr. 14, 2020

(54) MULTIPLE LEVEL WORK HYDRAULICS ANTI-STALL

(71) Applicant: Guangxi LiuGong Machinery Co., Ltd., Liuzhou, Guangxi (CN)

(72) Inventors: Aaron Becker, Wellsville, KS (US); Shengqing Yang, Guangxi (CN); Songtao Qie, Guangxi (CN); Hui Shao, Guangxi (CN)

(73) Assignee: Guangxi LiuGong Machinery Co., Ltd., Liuzhou, Guangxi (CN)

(*) Notice: Subject to any disclaimer, the term of this patent is extended or adjusted under 35 U.S.C. 154(b) by 0 days.

(21) Appl. No.: 15/514,783

(22) PCT Filed: Nov. 8, 2016

(86) PCT No.: PCT/CN2016/105019
§ 371 (c)(1),
(2) Date: Mar. 27, 2017

(87) PCT Pub. No.: WO2018/085974
PCT Pub. Date: May 17, 2018

(65) Prior Publication Data
US 2018/0230677 A1    Aug. 16, 2018

(30) Foreign Application Priority Data

Nov. 8, 2016    (WO) ............... PCT/CN2016/105019

(51) Int. Cl.
*E02F 9/22* (2006.01)
*B60W 30/188* (2012.01)
(Continued)

(52) U.S. Cl.
CPC ....... *E02F 9/2235* (2013.01); *B60W 30/1884* (2013.01); *B60W 30/1886* (2013.01);
(Continued)

(58) Field of Classification Search
CPC ..... E02F 9/2232; E02F 9/2296; E02F 9/2235; E02F 9/2062; E02F 9/225; B60W 30/1884; B60W 30/1886
See application file for complete search history.

(56) References Cited

U.S. PATENT DOCUMENTS

2005/0241304 A1* 11/2005 Bankestad ............ E02F 9/2228
60/445
2006/0018765 A1*  1/2006 Fransson ............... E02F 9/2217
417/213
(Continued)

FOREIGN PATENT DOCUMENTS

CN        1166866 A     12/1997
CN      201125402 Y     10/2008
(Continued)

OTHER PUBLICATIONS

European Patent Office; Extended European Search Report, Issued in Connection to EP16202102.6; dated Jul. 13, 2017; 8 pages; Europe.

(Continued)

*Primary Examiner* — Brian L Swenson
(74) *Attorney, Agent, or Firm* — Young Basile Hanlon & MacFarlane, P.C.

(57) ABSTRACT

The present invention relates to a vertical lift type loader comprising a power transmission arrangement with an engine, a hydraulic power system for powering work hydraulics of the loader and a drivetrain power system for powering locomotion of the loader, both being feedable with power from the engine, the hydraulic power system including a power limiter for limiting the power supply of the engine to the hydraulic power system to different power limit values, a determining device for determining an operational state of the loader, and a controller configured to control the power limiter to limit the power supply of the (Continued)

engine to the hydraulic power system to different power limit values, these power limit values being set depending on the operational state of the loader determined by the determining device.

20 Claims, 2 Drawing Sheets

(51) Int. Cl.
*E02F 9/20* (2006.01)
*E02F 3/34* (2006.01)

(52) U.S. Cl.
CPC ............ *E02F 9/2062* (2013.01); *E02F 9/225* (2013.01); *E02F 9/2296* (2013.01); *E02F 3/3405* (2013.01)

(56) References Cited

U.S. PATENT DOCUMENTS

| | | | |
|---|---|---|---|
| 2007/0193262 A1 | 8/2007 | Iwamoto | |
| 2008/0202468 A1* | 8/2008 | Grill | E02F 9/2235 123/339.14 |
| 2009/0031721 A1* | 2/2009 | Palo | E02F 9/2232 60/449 |
| 2009/0037072 A1* | 2/2009 | Lin | E02F 9/2246 701/99 |
| 2009/0069154 A1* | 3/2009 | Wegeng | B60K 25/06 477/111 |
| 2009/0156360 A1* | 6/2009 | Barngrover | B60W 10/06 477/111 |
| 2009/0217654 A1 | 9/2009 | Iwamoto | |
| 2009/0240406 A1* | 9/2009 | Fukushima | B60W 10/06 701/54 |
| 2010/0069196 A1* | 3/2010 | Shibata | B60W 20/30 477/3 |
| 2010/0179735 A1 | 7/2010 | Ekvall et al. | |
| 2011/0276236 A1 | 11/2011 | Shimada | |
| 2012/0304635 A1* | 12/2012 | Ooi | E02F 9/2246 60/431 |
| 2013/0006488 A1* | 1/2013 | Yamashita | B60W 10/30 701/54 |
| 2013/0190996 A1* | 7/2013 | Peterson | B60W 10/06 701/54 |
| 2013/0325268 A1* | 12/2013 | Ishihara | E02F 9/2246 701/50 |
| 2014/0069092 A1* | 3/2014 | Elliott | F16H 61/431 60/445 |
| 2014/0095048 A1* | 4/2014 | Peterson | B60W 50/14 701/101 |
| 2014/0322045 A1* | 10/2014 | Sakamoto | F15B 11/0423 417/364 |
| 2015/0075146 A1* | 3/2015 | Bedert | E02F 9/2253 60/327 |
| 2015/0139767 A1* | 5/2015 | Moriki | E02F 9/2066 414/699 |
| 2015/0275484 A1* | 10/2015 | Ishihara | E02F 9/2075 701/50 |
| 2016/0025023 A1* | 1/2016 | Kim | F02D 41/083 701/22 |
| 2016/0097186 A1* | 4/2016 | Yamada | B60K 6/365 701/50 |
| 2016/0121900 A1* | 5/2016 | Yoshizawa | E02F 9/2246 701/50 |
| 2016/0215479 A1* | 7/2016 | Ishihara | E02F 9/2075 |
| 2016/0332629 A1* | 11/2016 | Dionne | F16H 61/66 |
| 2016/0347321 A1* | 12/2016 | Ge | E02F 9/2246 |
| 2016/0348343 A1* | 12/2016 | Kanemitsu | E02F 9/123 |
| 2017/0002544 A1* | 1/2017 | Fletcher | E02F 9/2029 |
| 2017/0284316 A1* | 10/2017 | Hansen | E02F 9/2246 |
| 2017/0335867 A1* | 11/2017 | Meehan | B60K 6/12 |
| 2018/0009309 A1* | 1/2018 | Maringer | B60K 6/485 |

FOREIGN PATENT DOCUMENTS

| | | |
|---|---|---|
| CN | 101310101 A | 11/2008 |
| CN | 101395383 A | 3/2009 |
| CN | 101858091 A | 10/2010 |
| CN | 104024536 A | 9/2014 |
| EP | 1217128 A1 | 6/2002 |
| EP | 2891783 A1 | 7/2015 |
| JP | 2004100156 A | 4/2004 |

OTHER PUBLICATIONS

International Search Report in corresponding application No. PCT/CN2016/105019 dated Jul. 31, 2017.

First Office Action in corresponding Chinese Patent Application #201611046955.6, dated May 10, 2019, 8 pgs.

\* cited by examiner

MULTIPLE LEVEL WORK HYDRAULICS ANTI-STALL

CROSS REFERENCE TO RELATED APPLICATIONS

This patent application is a 35 U.S.C. § 371 national application of International Patent Application No. PCT/CN2016/105019, filed Nov. 8, 2016, which designated the United States and the contents of which are incorporated by reference herein in its entirety.

TECHNICAL FIELD

The present invention relates to a power transmission arrangement for a construction vehicle as well as a construction vehicle comprising such a power transmission arrangement. Furthermore, the present invention relates to a method of controlling such a power transmission arrangement of a construction vehicle. Preferably, the construction vehicle is a loader. The power transmission arrangement comprises an engine, a hydraulic power system for powering work hydraulics of the construction vehicle, and a drivetrain power system for powering locomotion of the construction vehicle. The hydraulic power system and the drivetrain power system are feedable with power from the engine.

BACKGROUND OF THE INVENTION

Earthmoving vehicles, such as loaders, typically comprise two primary power paths. A first power path for powering the ground drive of the vehicle, i.e. for locomotion of the loader, and a second power path for powering the work hydraulics of the vehicle, i.e. for moving boom and/or bucket of the loader, for example. Both power paths are usually powered by the vehicle's engine.

To decrease initial and operating costs of such earthmoving vehicles, installed engine power relative to rated operating loads has been reducing in recent years. Thus, hydraulic power requirements relative to engine power have been increasing. Consequently, especially in systems utilizing torque converter powershift transmissions, conditions arise, in which the engine lugs below a minimum RPM, which is required for achieving a necessary tractive effort, as too much power is consumed by the hydraulic system. In these situations, aspired operating tasks of the construction vehicle may not be completed satisfactorily.

To address this problem, a concept is known, in which a power limiter is provided in the hydraulic power system, the power limiter limiting the power supplied to the hydraulic power system to a prescribed fixed level. In other words, in these known systems, the hydraulic power path may not consume power of the engine beyond a prescribed fixed level, so as to always leave enough engine power available for the drivetrain power path to avoid a RPM drop below a minimal acceptable value.

However, these existing systems exhibit the drawback that the hydraulic power systems have, compared to the maximum power the machine may provide, reduced hydraulic power, thereby decreasing the construction vehicle's overall productivity.

SUMMARY OF THE INVENTION

It was therefore an object of the present invention to provide a power transmission arrangement for a construction vehicle with an engine, a hydraulic power system and a drivetrain power system, the power transmission arrangement exhibiting low initial and operating costs, allowing the provision of sufficient power to the drivetrain power system in all normal operating conditions of the vehicle, and allowing a high loading capability of the construction vehicle.

The invention is based on the idea that the systems of the prior art, which exhibit low initial and operation costs and allow the drivetrain power system to achieve maximum tractive effort in all normal operating conditions, exhibit relatively low available hydraulic power, as the power, which can be supplied to the hydraulic power system from the engine, is limited to a single fixed power limit value, this single fixed power limit value being independent from the operational state of the vehicle. However, by always limiting the hydraulic power to this single fixed power limit value, the available hydraulic power is unnecessarily restrained in situations, in which the maximal drivetrain power is not required. In other words, in some situations, the hydraulic power available is limited to a specific value, although operating conditions of the construction vehicle would allow the hydraulic power system to consume more power, as no or only little power is required for the drivetrain power system, for example.

The present invention exploits this idea by providing, in a first aspect, a power transmission arrangement for a construction vehicle, the transmission arrangement comprising an engine, a hydraulic power system for powering work hydraulics of the construction vehicle, and a drivetrain power system for powering movement, in other words locomotion, of the construction vehicle. The engine may be a diesel and/or an electric engine. However, other kinds of engines are also possible in this regard. The construction vehicle may be a loader, preferably a wheel loader. Alternatively, the construction vehicle may be a skid steer loader, bulldozer, paver or similar. In an embodiment, the power transmission arrangement may also be used for an agricultural machine. The hydraulic power system and the drivetrain power system are feedable with power from the engine. The drivetrain power system may be a mechanical system, in which power is substantially transmitted via mechanical components, and/or a hydraulic system, in which power is substantially transmitted via hydraulic components.

Furthermore, the hydraulic power system includes a power limiter, which is configured to limit the power supply of the engine to the hydraulic power system to different, i.e. multiple, power limit values. To limit power supply to a system to a certain power limit value is understood in the context of this invention as to provide a boundary/threshold value, up to which power may be fed to this system. In other words, less but not more power than the boundary/threshold value may be supplied to the system. The power limiter may be configured to limit the power to four, three, or particularly two different values. However, in the context of this invention, also every other number of values is conceivable. In this regard, it is also conceivable and covered by the invention that the power limiter may be configured to limit the power to an infinite number of values, the system preferably autodetecting the allowable and available hydraulic power and continuously adjusting for optimum productivity.

In addition, the power transmission arrangement comprises a determining device for determining an operational state of the construction vehicle. The operational state of the vehicle is indicative of the operational tasks to be performed with the construction vehicle. In other words, the operational state is indicative for the required distribution of power between the drivetrain and the hydraulic power systems. The determining device may be an automatically operated determining device, which may include a sensor, for automatically determining an operational state of the vehicle. The determining device may also be a manually operated determining device, which may be operated by an operator of the construction machine, e.g. by pushing a bottom and/or flicking a switch and/or by voice control or other mechanisms. A combination of any automatically and any manually operated determining device is also conceivable.

The power transmission arrangement also includes a controller, which is configured to control the power limiter of the hydraulic power system to limit the power supply of the engine to the hydraulic power system to different, i.e. multiple, power limit values. Furthermore, the controller is configured to set these different power limit values depending on the operational state of the construction vehicle determined by the determining device. In other words, depending on the operational state of the construction vehicle determined by the determining device, the controller is configured to determine the power limit value to which the power supply from the engine to the hydraulic power system is limited. Different operational states of the construction vehicle may therefore imply different power limit values of the power limiter. In this regard, also design parameters may have an influence on the power limit values. Accordingly, a multiple set-point limiting control for the power supply from the engine to the hydraulic power system may be provided by the present invention.

According to the present invention, it is possible to adjust the power limit values of the power limiter to the operational state of the construction vehicle. Accordingly, the distribution of power between hydraulic power system and the drivetrain power system is variably restrictable, therefore allowing for an optimization of power distribution between the multiple power paths depending on the operational state of the vehicle. If the determining device and the controller determine that most engine power is needed in the drivetrain power system, e.g. upon filling of a bucket of a loader, the power limiter may limit the power supply from the engine to the hydraulic power system to a low power limit value, therefore leaving more available power to the drivetrain power system, so as to mitigate an RPM droop below a minimum RPM, which is required for providing maximal tractive effort. In contrast, if the determining device and the controller determine that most engine power is needed in the hydraulic power system, e.g. upon lifting a filled bucket of a wheel loader, the power limiter may limit the power supply from the engine to the hydraulic power system to a higher power limit value, therefore providing more available power to the hydraulic power system, so as to improve capacity and therefore processing ability and variety of the construction vehicle.

Consequently, the present invention provides a power transmission arrangement, providing sufficient power to the drivetrain power system in all normal operating conditions of the construction vehicle, exhibiting low initial and operating costs, and providing high hydraulic power and therefore exhibiting high capacity. Compared to the systems of the prior art, the system of the present invention therefore provides an enhanced operation when both digging and performing other operations, such as lift and carry.

According to an embodiment of the invention, the drivetrain power system includes a torque convertor. For such a power transmission arrangement, the present invention exhibits a particularly positive impact. Specifically, torque convertor output torque is directly proportional to wheel torque and maximum tractive effort of the construction vehicle. Furthermore, the output torque of the torque convertor correlates with the input RPM of the torque convertor in a non-linear fashion. Namely, the maximum available output torque of the torque convertor drops disproportionately to a drop in input RPM of the torque convertor. According to this preferred embodiment of the present invention, if maximum tractive effort is required, the power limiter is able to limit the power supply of the engine to the hydraulic power system to a value, which allows for the provision of enough power to the drivetrain power system so as to prevent a substantial drop in engine RPM and therefore input RPM to the torque convertor, as such a drop in input RPM to the torque convertor implies a disproportionate drop in tractive effort.

According to an embodiment of the invention, the power limiter of the hydraulic power system includes a variable pump, particularly a variable displacement pump. The variable displacement pump may be a variable piston pump. The variable pump is controllable by the controller to limit the output power thereof to a maximum allowed value. This provides a power limiter with low complexity and great variability.

According to an embodiment of the invention, the controller is configured to control the power limiter to limit the power supply of the engine to the hydraulic power system to a first power limit value and a second power limit value, the second power limit value being higher than the first power limit value. Accordingly, the construction vehicle may be put into a state, in which more engine power is attributable to the hydraulic power system, thereby enhancing operation when both digging and performing other operations, such as lift and carry, and into a state, in which maximum tractive effort may be achieved.

The first power limit value may be selected such that it allows maximum tractive effort of the construction machine to be achieved. Maximum tractive effort of the construction machine according to the present invention is defined as the highest tractive force that can be generated under any condition that is not injurious to the vehicle or machine, and that allows a power transmittal without wheel slip, the tractive force depending on the usual ground conditions the vehicle is used in and on the vehicle's weight. This embodiment provides the advantage that the construction vehicle may be put into a state, in which maximum tractive effort is achievable despite of the nominal demands of the hydraulic power system, while at the same time allowing for a reduction in engine size as compared to hydraulic work, and inherently, to work performed by the vehicle to decrease initial and operating costs.

Further, the second power limit value may be selected such that it allows conventional tasks of the hydraulic power system to be conducted at maximum power capacity of the hydraulic power system of the construction vehicle. In the scope of the present invention maximum power capacity of the hydraulic power system is understood as the rated power capacity thereof, i.e. the maximum power the hydraulic system is designed to provide. This embodiment provides the advantage that the construction vehicle may be put into a state, in which maximum hydraulic power capacity and maximum tractive effort is achievable, while at the same time allowing for a reduction in engine size to decrease initial and operating costs.

According to an embodiment, the controller is configured to determine the power limit values based on the operational state determined by the determining device from a map stored in the controller, the map comprising a plurality, preferably more than 100, even more preferred more than 1000 and still even more preferred an infinite number of different pairs, each pair consisting of a power limit value and a corresponding operational state of the construction vehicle. This embodiment provides the advantage that the power distribution between drivetrain and hydraulic power systems may be optimized for each specific operational state of the construction vehicle. In other words, for each operational state of the construction vehicle, an ideal power limit value, which allows for an ideal distribution of power between the drivetrain and hydraulic power system, may be provided.

According to an embodiment, the determining device is configured to determine an operational state of the transmission of the drivetrain power system. Preferably, the determining device is configured to determine how much power of the engine is allocated to the transmission. This embodiment has the advantage that power allocation to the transmission can be determined with relatively low complexity. Furthermore, the operational state of the transmission functions as an ideal indicator for how much power is required by the drivetrain power system.

The determination may be conducted by analyzing whether the transmission is operating in first gear and/or a kickdown has been actuated and/or by sensing the relative speeds into and out of the torque converter and/or by sensing engine speed and transmission output speeds and/or by sensing actual torque at any point in the driveline from the torque converter to the wheels and/or by manual actuation by the operator. These mechanisms allow for a determination of power in the transmission with relatively low complexity and high accuracy.

According to an embodiment, the controller is configured to control the power limiter to limit the power supply of the engine to the hydraulic power system to the first power limit value, the first power limit value allowing a maximum tractive effort of the construction machine to be achieved, if the determining device determines that the transmission is operating in first gear and/or a kickdown has been actuated, and is further configured to control the power limiter to limit the power supply of the engine to the hydraulic power system to the second power limit, the second power limit value allowing conventional tasks of the hydraulic power system to be conducted at maximum power capacity of the hydraulic power system of the construction vehicle value, in all other situations, i.e. if the determining device does not determine that that the transmission is operating in first gear and/or a kickdown has been actuated. This embodiment provides a power transmission arrangement with low initial and operating costs, the arrangement allowing for maximum tractive effort and providing high hydraulic power when needed, while exhibiting a low complexity.

According to an embodiment, the hydraulic power system includes a work hydraulic power system for powering work hydraulics of the construction vehicle and a steer hydraulic power system for power steer hydraulics of the construction vehicle.

In a second aspect, the present invention provides a construction vehicle having a power transmission arrangement according to one of the previously described embodiments. The construction vehicle may be a loader, preferable a wheel loader. Furthermore, the loader may include an articulating frame arrangement consisting of a front frame portion and a rear frame portion, which are articulatingly interconnected for providing an articulating steering, the steering being powered by steer hydraulics.

In a third aspect, the present invention provides a method of controlling a power transmission arrangement of a construction vehicle, optionally a wheel loader, the construction vehicle including the power transmission arrangement according to one of the previously described embodiments. The method comprises the determination of an operational state of the construction vehicle with the determining device, the limitation of the power supply of the engine to the hydraulic power system with the power limiter to a first power limit value, and the limitation of the power supply of the engine to the hydraulic power system with the power limiter to a second power limit value, which is different from the first power limit value. Furthermore, the first and second power limit values are set depending on the operational state of the construction vehicle determined with the determining device.

Concerning the advantages of the second and third aspects of the present invention, it is referred to the advantages outlined in combination with the first aspect of the invention.

It is noted that the above embodiments and alternatives can be applied as single measure or in combination. Moreover, it is explicitly noted that the application of the power transmission arrangement is not limited to loaders, but is applicable to any other machine exhibiting a hydraulic and a drivetrain power system.

DETAILED DESCRIPTION OF A PREFERRED EMBODIMENT

In the following a preferred embodiment of the invention will be described with reference to the accompanying drawings.

Figure 1:
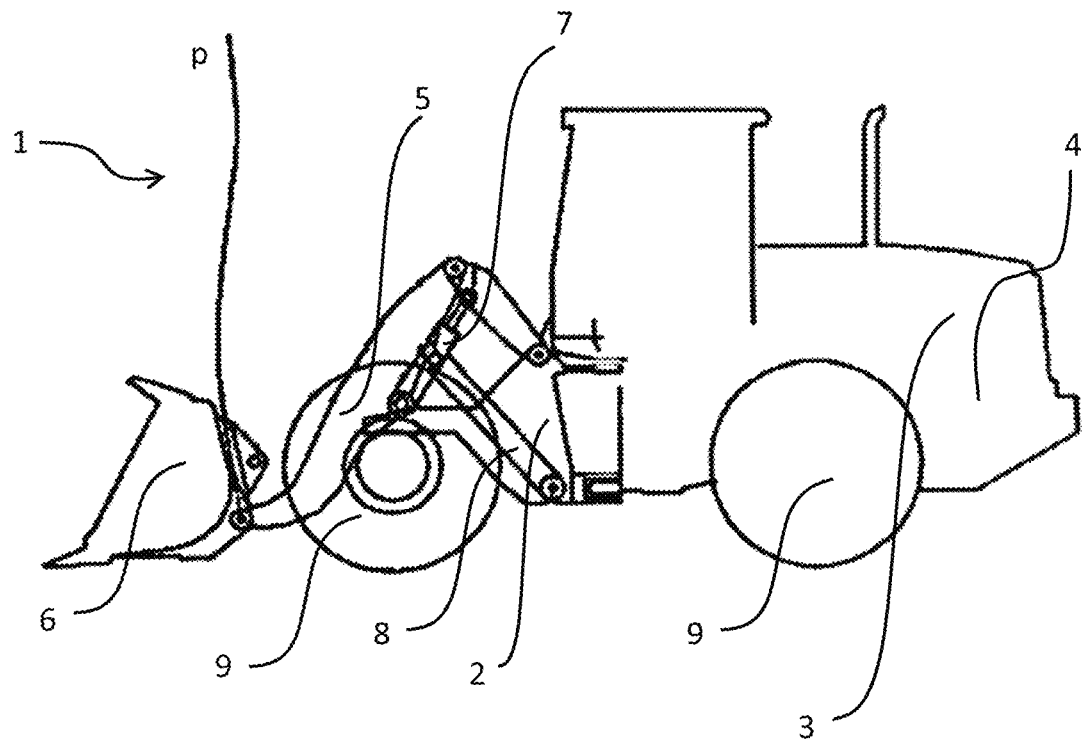
FIG. 1 illustrates a construction vehicle with a power transmission arrangement according to an embodiment of the present invention.

FIG. 1 shows a construction vehicle 1 with a power transmission arrangement according to a preferred embodiment of the present invention. In this preferred embodiment, the construction vehicle 1 is a loader, preferably a wheel loader. However, the construction vehicle of this preferred embodiment is not limited to a loader but may be an excavator or any other type of construction vehicle including an engine, a hydraulic power system and a drivetrain power system.

The loader 1 of this preferred embodiment may include an articulating frame arrangement consisting of a front frame portion 2 and a rear frame portion 3, which are articulatingly interconnected for providing an articulating steering. The loader 1 may further include a boom 5, which is connected to a bucket 6 or a lifting fork, wherein boom 5 and bucket 6 are preferably mounted to the front frame portion 2 of the articulating frame arrangement. Furthermore, the wheel loader 1 may be of a vertical lift type, allowing the bucket 6 or lifting fork to move along a substantially vertical path p between a lowered and a lifted position, such a vertical lifting type wheel loader being described in EP 3 051 031 A1 and EP 3 051 032 A1, the whole content of these applications being incorporated herein by reference.

Figure 2:
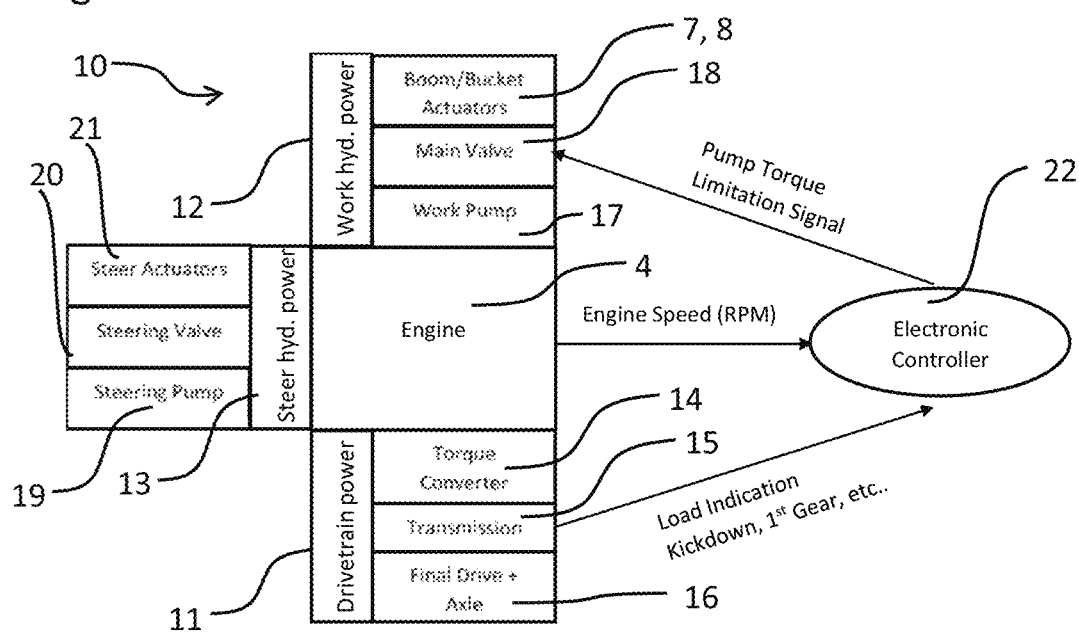
FIG. 2 illustrates a block diagram of the power transmission arrangement of the construction vehicle of FIG. 1.

In this preferred embodiment, the wheel loader 1 comprises a power transmission arrangement 10, which is schematically illustrated in FIG. 2. The power transmission arrangement 10 includes an engine 4, which might be located at the rear frame portion 3 of the articulating frame arrangement of the loader 1, a drivetrain power system 11 for powering locomotion/movement of the construction vehicle 1 and a hydraulic power system 12, 13, as illustrated in FIG. 2. The hydraulic power system may include a work hydraulic power system 12 for powering work hydraulics 7, 8 of the construction vehicle 1, the work hydraulics 7, 8 being provided for lifting boom 5 and bucket 6 of the loader, for example, and a steer hydraulic power system 13 for powering articulating steering with the articulating frame arrangement of the wheel loader 1. However, in this preferred embodiment, the hydraulic power system may also be limited to either the work hydraulic power system 12 or the steer hydraulic power system 13. The engine 4 of this preferred embodiment is preferably a diesel engine but may also be an electric engine. A combination of a diesel and an electric engine is also conceivable in this regard.

In this preferred embodiment, the hydraulic power system, i.e. the work hydraulic power system 12 and the steer hydraulic power system 13, as well as the drivetrain power system 11 are both powered by the engine 4. In other words, energy/power is supplied from the engine 4 to the hydraulic power system 12, 13 and the drivetrain power system 11. In this regard, it is also conceivable that one of the sub systems of the hydraulic power system 12, 13 exhibits a power source, for example an engine, of its own, such that only one of the sub systems of the hydraulic power system 12, 13 is powered by the engine 4 of the construction vehicle.

The drivetrain power system 11 of the power transmission arrangement 10 if the construction vehicle 1 of this preferred embodiment may comprise a torque convertor 14, which may be coupled to the output shaft of the engine 4, a transmission 15, which may be coupled to the output shaft of the torque convertor 14, and a final drive including axles 16, which may be coupled to the output of the transmission 15. To the axles, the wheels 9 of the loader 1 are preferably connected. However, it is also possible that the axles are provided for powering tracks of the loader. The purpose of the drivetrain power system 11 in this preferred embodiment is the provision of engine power to the wheels 9 or tracks of the construction vehicle for moving the entire loader 1.

The steer hydraulic power system 13 of the power transmission arrangement 10 of the construction vehicle 1 of this preferred embodiment may include a steering pump 19, a steering valve 20, which may be connected to the steering pump 19, and steer actuators 21, which may be connected to the steering valve 20. The steer hydraulic power system is not illustrated in FIG. 2. The purpose of the steer hydraulic power system 13 is the powering of the articulating steering with the articulating frame arrangement of the loader 1. In this regard, it is also conceivable that the steer hydraulic power system 13 does not include a separate steering pump 19 but is be coupled with a work pump 17 of the work hydraulic power system 12.

Figure 3:
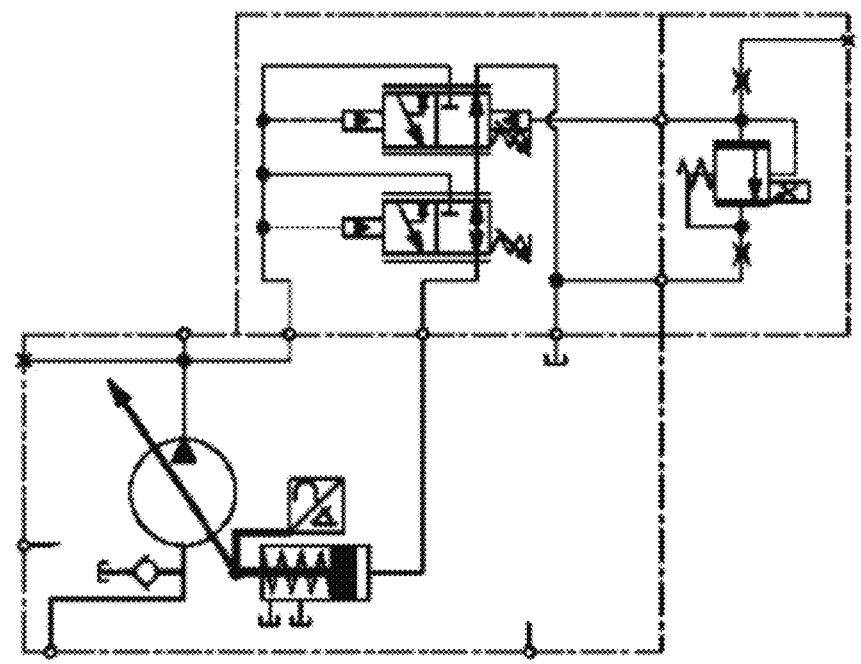
FIG. 3 illustrates an exemplary hydraulic diagram of a power limiter of the power transmission arrangement of FIGS. 2.

The work hydraulic power system 12 of the power transmission arrangement 10 of the construction vehicle 1 according to this preferred embodiment may include a work pump 17, a main valve 18, which may be connected to the work pump 17, and actuators 7, 8 for manipulation of the boom 5 and the bucket 6 of the wheel loader 1, for example, wherein the actuators 7, 8 may be connected to the main valve 18. In this preferred embodiment, the hydraulic power system 12, 13 may include a power limiter. Preferably, this power limiter is embodied by the work pump 17 of the work hydraulic power system 12. Alternatively, the power limiter may be the steering pump 19 of the steer hydraulic power system 13 or combination of the steering pump 19 and the working pump 17. Also a different kind of power limiter is possible in this regard. The working pump 17 of the work hydraulic power system 12 may be a variable pump, preferably a variable displacement piston pump. Such a pump is capable of limiting the power, which is supplied from the engine 4 to the hydraulic power system 12, 13 to a specific value. This is achieved by controlling the pump displacement in accordance with the pump outlet pressure, for example. As pump outlet pressure increases, allowed displacement is restricted; conversely, if working pressure is reduced, the allowed pump displacement is increased. FIG. 3 shows an exemplary hydraulic diagram for such a power limiter. Preferably, the power limiter is configured with a load sense, a pressure compensation and an adjustable torque control.

In addition, the power transmission arrangement 10 of the construction vehicle 1 according to this preferred embodiment comprises a determining device for determining an operational state of the construction vehicle 1. In this preferred embodiment, the determining device includes a sensor for determining the state of the transmission 15 of the drivetrain power system 11. Preferably, the determining device is configured to determine whether the transmission 15 is operating in first gear and/or a kickdown has been initiated. However, this preferred embodiment is not limited to such a determining device. In contrast, in this preferred embodiment, any signal may be used that may be derived from the operational state of the construction vehicle 1, and that allows the determination of whether maximum tractive effort is needed or not.

Furthermore, the power transmission arrangement 10 of the construction vehicle 1 of this preferred embodiment includes an electric controller 22. The electric controller 22 may be any kind of microprocessor and preferably comprises a storage. However, also a hydraulic and/or manual controller is conceivable in this regard. The controller 22 of this preferred embodiment is connected to the determining device for receiving a signal, which is indicative of the operational state of the construction vehicle, the operational state being determined by the determining device. Furthermore, the controller 22 is preferably connected to the engine 4 to receive the engine speed as input signal. In addition, the controller 22 is connected to the power limiter of the hydraulic power system 12, 13, which is embodied in this preferred embodiment by the work pump 17 of the work hydraulic power system 12. The controller 22 is configured to send a power limit value signal to the power limiter, i.e. the work pump 17, of the work hydraulic power system 12 to limit the consumption of engine power of the hydraulic power system 12, 13 to this power limit value. Specifically, the controller 22 is configured to send different power limit value signals to the power limiter of the work hydraulic power system 12. Such a power limit value signal may be a voltage and/or a current that is representative of the allowed power/torque the pump is allowed to consume. The work pump 17 may convert this voltage and/or current signal into an allowed displacement versus pressure for the pump output.

Figure 4:
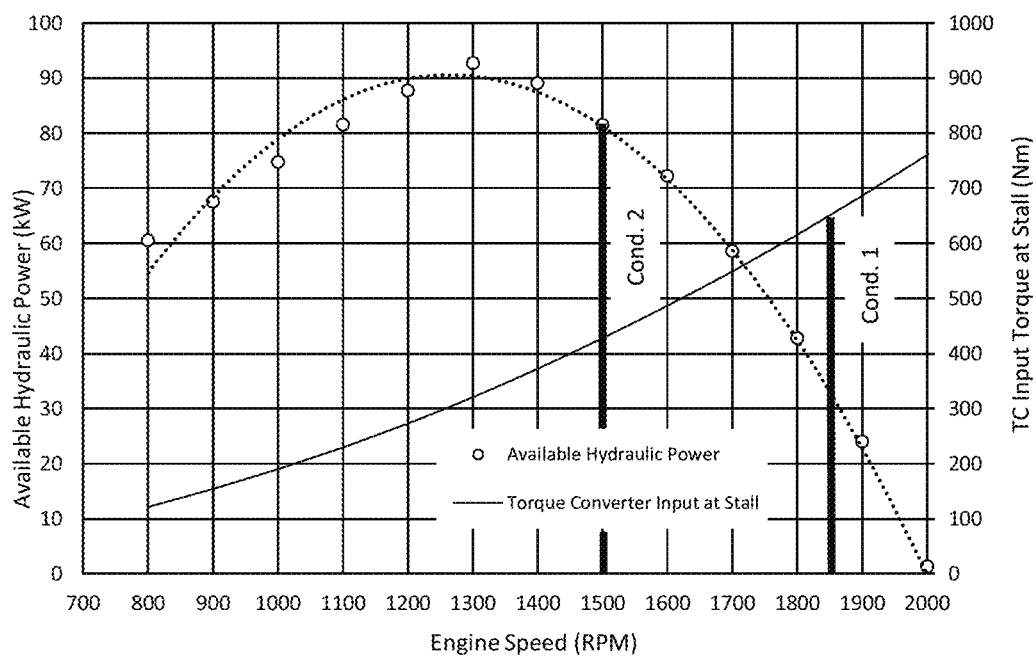
FIG. 4 illustrates a relationship between engine speed, hydraulic power and drivetrain power implemented in a controller of the power transmission arrangement, which is schematically illustrated in FIG. 2.

In the following, a control mechanism of controlling the power limiter of the hydraulic power system 12, 13 of the power transmission arrangement 10 of the construction vehicle 1 of this preferred embodiment, which is preferably implemented in the controller 22, is described with reference to FIG. 4.

In a first step of this control mechanism, the operational state of the transmission 15 of the drivetrain power system 11 is determined with the determining device. Specifically, in this preferred embodiment, the determining device detects whether the transmission is operating in first gear and/or a kickdown has been actuated.

The result of this determination is sent to the controller 22, which decides whether maximum tractive effort is required based on the operational state of the construction vehicle 1 determined by the determining device. If maximum tractive effort is required, the power limiter of the hydraulic power system 12, 13 of the power transmission arrangement 10 is set to a first power limit value, this first power limit value allowing maximum tractive effort to be achieved by the drivetrain power system 11. In other words, this maximum tractive effort may be achieved by the drivetrain power system 11, as the power consumed by the hydraulic power system 12, 13 is limited to this first value, this first value being selected such that enough engine power and speed is left for the drivetrain power system 11 to achieve maximum tractive effort of the construction machine 1. In FIG. 4, this first power limit value is indicated as condition 1. In an exemplary construction vehicle of this preferred embodiment, the first power limit value may be approximately 35 kW. However, this first power limit value may be any other value and depends on the type of machine, the type of engine, the machine capacity etc. Setting the first power limit value to 35 kW may allow the drivetrain power system 11 of an exemplary construction vehicle of this preferred embodiment to absorb 650 Nm of engine torque, for example. Again, the amount of absorbed engine torque may be any other value and depends on the type of engine, the machine capacity etc.

On the contrary, if the controller 22 decides based on the operational state of the construction vehicle 1 determined by the determining device that maximum tractive effort is not required, the controller 22 is configured to set the power limiter, i.e. the work pump 17, of the work hydraulic power system 12 of the power arrangement 10 of the construction vehicle 1 to a second power limit value, this second power limit value being higher than the first power limit value. In FIG. 4, this second power limit value is indicated as condition 2. In this preferred embodiment, this second power limit value may be set such that the work hydraulics 7, 8 have enough maximum hydraulic power available to conduct conventional tasks at maximum power capacity of the work hydraulic power system 12 of the power transmission arrangement 10 of the construction vehicle 1. In an exemplary construction vehicle of this preferred embodiment, the second power limit value may be set to approximately 80 kW, implying that, in this exemplary construction vehicle of this preferred embodiment, the drivetrain power system 11 may only absorb approximately 420 Nm of engine torque. Again, the power limit value and the amount of absorbed engine torque may be any other value and depend on the type of engine, the machine capacity etc.

What is claimed:

1. A vertical lift type loader for moving a bucket or lifting fork along a substantially vertical path between a lowered and a lifted position, comprising:
    a power transmission arrangement, comprising:
        an engine;
        a hydraulic power system for powering work hydraulics of the loader, which is feedable with power from the engine, the hydraulic power system including a power limiter for limiting a power supply of the engine to the hydraulic power system to different power limit values;
        a drivetrain power system for powering locomotion of the loader, the drivetrain power system being feedable with power from the engine;
        a determining device for determining an operational state of the loader; and
        a controller configured to control the power limiter to limit the power, which is supplied to the hydraulic power system from the engine, to a first power limit value if the operational state of the loader is such that the drivetrain power system is operating in first gear, and to a second power limit value in all other situations, wherein the second power limit value is higher than the first power limit value.

2. The loader according to claim 1, wherein the drivetrain power system includes a torque convertor.

3. The loader according to claim 1, wherein the power limiter includes a variable displacement pump, which is controllable by the controller.

4. The loader according to claim 1, wherein the first power limit value allows a maximum tractive effort of the loader to be achieved with the drivetrain power system.

5. The loader according to claim 1, wherein the second power limit value allows conventional tasks of the hydraulic power system to be conducted at maximum power capacity of the hydraulic power system.

6. The loader according to claim 1, wherein the determining device is configured to determine the operational state of the loader by determining an operational state of a transmission of the drivetrain power system.

7. The loader according to claim 6, wherein the determining device is configured to determine how much power of the engine is allocated to the transmission of the drivetrain power system.

8. The loader according to claim 7, wherein an amount of power of the engine, which is allocated to the transmission of the drivetrain power system, is determined by analyzing whether the transmission of the drivetrain power system is operating in first gear.

9. The loader according to claim 7, wherein an amount of power of the engine, which is allocated to the transmission of the drivetrain power system, is determined by analyzing whether a kickdown has been actuated.

10. The loader according to claim 7, wherein an amount of power of the engine, which is allocated to the transmission of the drivetrain power system, is determined by sensing relative speeds into and out of a torque converter.

11. The loader according to claim 7, wherein an amount of power of the engine, which is allocated to the transmission of the drivetrain power system, is determined by sensing engine speed and transmission output speeds.

12. The loader according to claim 7, wherein an amount of power of the engine, which is allocated to the transmission of the drivetrain power system, is determined by sensing actual torque at any point in a driveline from a torque converter to wheels.

13. The loader according to claim 7, wherein an amount of power of the engine, which is allocated to the transmission of the drivetrain power system, is determined by manual actuation by an operator.

14. The loader according to claim 1, wherein the hydraulic power system includes a work hydraulic power system for powering work hydraulics of the loader and a steer hydraulic power system for powering steer hydraulics of the loader.

15. The loader according to claim 1, wherein the loader is a wheel loader.

16. The loader according to claim 1, wherein the loader includes an articulating frame arrangement consisting of a front frame portion and a rear frame portion, which are articulatingly interconnected for providing an articulating steering, the articulating steering being powered by steer hydraulics.

17. A vertical lift type loader for moving a bucket or lifting fork along a substantially vertical path between a lowered and a lifted position, comprising:
  a power transmission arrangement, comprising:
  an engine;
  a hydraulic power system for powering work hydraulics of the loader, which is feedable with power from the engine, the hydraulic power system including a power limiter for limiting a power supply of the engine to the hydraulic power system to different power limit values;
  a drivetrain power system for powering locomotion of the loader, the drivetrain power system being feedable with power from the engine;
  a determining device for determining an operational state of the loader; and
  a controller configured to control the power limiter to limit the power, which is supplied to the hydraulic power system from the engine, to a first power limit value if the operational state of the loader is such that a kickdown has been actuated, and to a second power limit value in all other situations, wherein the second power limit value is higher than the first power limit value.

18. The loader according to claim 17, wherein the determining device is configured to determine the operational state of the loader by determining an operational state of a transmission of the drivetrain power system.

19. The loader according to claim 18, wherein the determining device is configured to determine how much power of the engine is allocated to the transmission of the drivetrain power system.

20. The loader according to claim 19, wherein an amount of power of the engine, which is allocated to the transmission of the drivetrain power system, is determined by analyzing whether a kickdown has been actuated.

* * * * *